(12) United States Patent
Glenn

(10) Patent No.: US 12,240,282 B2
(45) Date of Patent: *Mar. 4, 2025

(54) TRAILER THEFT LOCK

(71) Applicant: Rondoyle Glenn, Hamtramck, MI (US)

(72) Inventor: Rondoyle Glenn, Hamtramck, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,857

(22) Filed: Oct. 7, 2023

(65) Prior Publication Data

US 2024/0181821 A1 Jun. 6, 2024

Related U.S. Application Data

(63) Continuation of application No. 17/150,605, filed on Jan. 15, 2021, now Pat. No. 11,912,081.

(60) Provisional application No. 62/961,312, filed on Jan. 15, 2020.

(51) Int. Cl.
B60D 1/60 (2006.01)
B60D 1/04 (2006.01)
G01S 19/42 (2010.01)

(52) U.S. Cl.
CPC .............. B60D 1/60 (2013.01); B60D 1/04 (2013.01); G01S 19/42 (2013.01)

(58) Field of Classification Search
CPC .. B60D 1/60; B60D 1/04; G01S 19/42; B60R 25/00
See application file for complete search history.

(56) References Cited

U.S. PATENT DOCUMENTS

| 2,847,232 | A |   | 8/1958  | Graham |            |
|-----------|---|---|---------|--------|------------|
| 3,664,686 | A |   | 5/1972  | Anderson |          |
| 3,844,143 | A |   | 10/1974 | Hudson |            |
| 4,380,160 | A | * | 4/1983  | Hoffman | ......... B60D 1/60 |
|           |   |   |         |         | 70/56      |
| 4,389,160 | A |   | 6/1983  | Onal   |            |
| D312,958  | S | * | 12/1990 | Aguilar, Jr. | ............. D8/346 |
| 5,343,720 | A |   | 9/1994  | Slater |            |

(Continued)

OTHER PUBLICATIONS https://www.youtube.com/watch?v=W4_A04MHzgU.

*Primary Examiner* — Kevin Hurley
*Assistant Examiner* — Michael R Stabley
(74) *Attorney, Agent, or Firm* — Gregson IP Law LLC

(57) ABSTRACT

A lunette ring lock includes a lunette ring enclosure having a top plate coupled to a bottom plate by a pair of opposing side walls along a width and a front plate having a pair of long edges along its length and a pair of side edges, a pair of matching notches including a top notch in the top plate and a bottom notch the bottom plate centered along a back edge for surrounding a mounting plate to the lunette ring, a locking pin 202 for passing through a through hole in the top plate and a through hole in the bottom plate after passing through the lunette ring enclosure, and a rectangular blocking tube coupled to the top plate adjacent to the top notch extending upward from the top plate. The lock connecting top element engages a puck lock to retain the locking pin to the lunette ring lock between the through hole in the top plate and the through hole in the bottom plate. The front plate is coupled between the top place and bottom plates along the pair of long edges and coupled to the pair of opposing sidewalls along the side edges. the locking pin comprises a lock connecting top element, a bottom coupling surface element, and a central shaft element.

8 Claims, 11 Drawing Sheets

(56) References Cited

U.S. PATENT DOCUMENTS

| | | | |
|---|---|---|---|
| D417,133 S | 11/1999 | Niswanger | |
| 6,070,441 A | 6/2000 | Bernstrom | |
| 6,467,317 B1 | 10/2002 | Hillabush et al. | |
| 6,578,392 B1 | 6/2003 | Bowman et al. | |
| 6,598,432 B1 | 7/2003 | Dwyer | |
| 6,698,256 B2 | 3/2004 | Witchey | |
| 6,862,904 B1 | 3/2005 | Hubbart | |
| 6,925,842 B1 * | 8/2005 | Hillabush | B60R 25/001 70/56 |
| 7,107,799 B1 * | 9/2006 | Marley | B60D 1/60 70/416 |
| 7,377,536 B2 | 5/2008 | Rehme | |
| 8,033,563 B2 | 10/2011 | Good | |
| 8,152,194 B1 | 4/2012 | Landgraf | |
| 11,345,200 B2 * | 5/2022 | Draper | B60D 1/24 |
| 11,345,299 B2 | 5/2022 | Jeong | |

\* cited by examiner

TRAILER THEFT LOCK

CROSS-REFERENCE TO RELATED APPLICATION

This application claims priority to U.S. patent application Ser. No. 17/150,605, filed on Jan. 15, 2021, which itself claims priority to U.S. Provisional Patent Application No. 62/961,312, titled "Mean Dog Eye Lock," and filed on Jan. 15, 2020. The entire application is incorporated herein by reference in its entirety.

TECHNICAL FIELD

This application relates in general to an article of manufacture for providing a trailer aid, and more specifically, to an article of manufacture providing a lunette ring trailer hitch lock.

BACKGROUND

Trailer thefts are on the rise. It's difficult to track stolen trailers, especially since some states don't require certain ones to be registered. More importantly, it takes minutes to back up a truck, unhitch an unprotected trailer and steal it and its contents. Authorities even report cases of "transloading" where thieves steal a trailer, drive it to another location, empty its contents into a legally owned trailer, and leave the stolen trailer behind. The total loss is often in the tens of thousands of dollars. Trailer hitch locks are a good deterrent, but current locks on the market are easy to work around.

All of the above is especially true of larger trailers that use a lunette ring trailer hitch to permit items such as chippers, generators, dumpsters, and similar trailered devices weighing between 25,000 lbs. and 50,000 lbs. to be towed from one location to another. These trailers and items are expensive and are typically left out on jobsites from time to time in which they may be unattended. To protect these trailers from theft, some people use a simple lunette ring lock that is secured within the lunette ring that connects to a hitch of a vehicle so that is may be towed. Unfortunately, lunette rings have additional weaknesses in the manner that the lunette rings are mounted to a trailer that permits additional rings to be attached to a mounting plate that bypasses the lunette ring having a lock. Alternatively, the mounting brackets are typically coupled to the trailer in a fashion that permits the entire mounting bracket to be removed and a new mounting bracket and replacement lunette ring installed in its place, all without removing the existing lunette ring locks. As such, the existing lunette ring locks do not provide adequate security to trailers on to which they are installed.

Therefore, a need exists for an article of manufacture for providing a lunette ring trailer hitch lock. The present invention attempts to address the limitations and deficiencies in prior solutions according to the principles and example embodiments disclosed herein.

SUMMARY

In accordance with the present invention, the above and other problems are solved by providing an article of manufacture for a lunette ring trailer hitch lock according to the principles and example embodiments disclosed herein.

In one embodiment, the present invention is an article of manufacture for providing a lunette ring trailer hitch lock. The lunette ring lock includes a lunette ring enclosure having a top plate coupled to a bottom plate by a pair of opposing side walls along a width and a front plate having a pair of long edges along its length and a pair of side edges, a pair of matching notches including a top notch in the top plate and a bottom notch the bottom plate centered along a back edge for surrounding a mounting plate to the lunette ring; a locking pin for passing through a through hole in the bottom plate and a through hole in the top plate after passing through the lunette ring enclosure, and a rectangular blocking tube coupled to the top plate adjacent to the top notch extending upward from the top plate. The locking pin comprises a lock connecting top element, a bottom coupling surface element, and a central shaft element. The lock connecting top element engages a puck lock to retain the locking pin to the lunette ring lock between the through hole in the bottom plate and the through hole in the top plate. The front plate is coupled between the top place and bottom plates along the pair of long edges and coupled to the pair of opposing sidewalls along the side edges.

In another aspect of the present disclosure, the lunette ring lock further comprises a blocking tube mounting angle coupled to one side of the rectangular blocking tube at a lower end and coupled to the top plate adjacent to the top notch.

In another aspect of the present disclosure, the lunette ring lock further includes a pin head tube coupled to the top plate and centered around the through hole in the bottom plate to surround the bottom coupling surface element when the locking pin is installed, and a puck lock holder coupled to the bottom plate and centered around the through hole in the top plate to surround a puck lock coupled to the locking pin when installed.

In another aspect of the present disclosure, the front plate comprise a multi-panel enclosing plate from matching shape of a front edge of the top plate and the bottom plate.

In another embodiment, the present invention is an article of manufacture for providing a lunette ring lock for surrounding a lunette ring hitch and the lunette ring coupling to a mounting bracket on a trailer. The lunette ring lock includes a lunette ring enclosure having a top plate coupled to a bottom plate by a pair of opposing side walls along a width and a front plate having a pair of long edges along its length and a pair of side edges, the lunette ring enclosure encases the lunette ring hitch and a mounting bracket for blocking access to bolts and mating nuts coupling the lunette ring to the mounting bracket, and a locking pin for passing through a through hole in the bottom plate and a through hole in the top plate after passing through the lunette ring enclosure, the locking pin comprises a lock connecting top element, a bottom coupling surface element, and a central shaft element. The lunette ring enclosure encases the lunette ring hitch and a mounting bracket for blocking access to bolts and mating nuts coupling the lunette ring to the mounting bracket. The lock connecting top element engages a puck lock to retain the locking pin to the lunette ring lock between the through hole in the bottom plate and the through hole in the top plate after the locking pin is inserted through lunette ring hitch.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
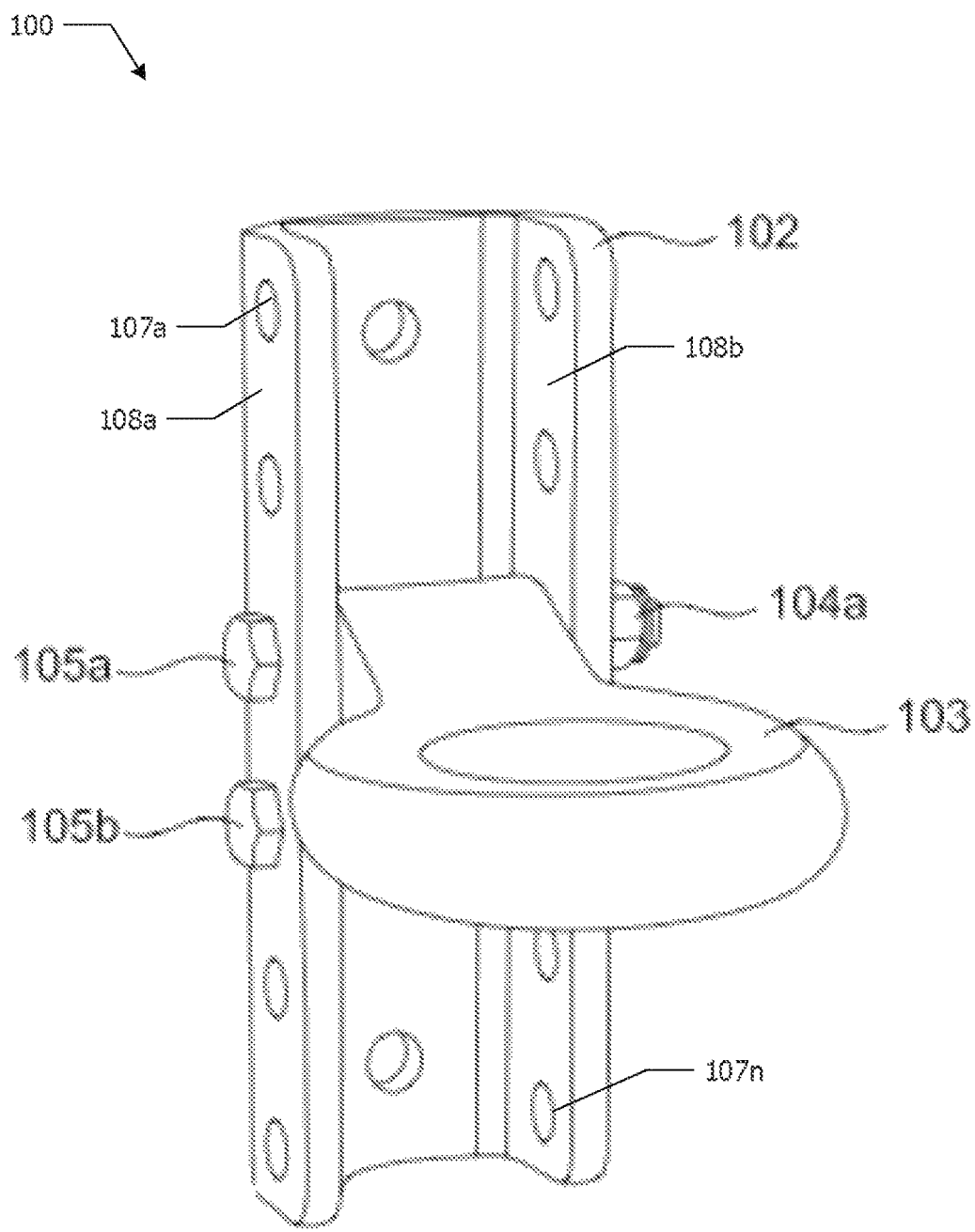
FIG. 1 illustrates a prior art example of a lunette ring trailer hitch coupled to a mounting bracket for use with the present invention.

This application relates in general to an article of manufacture for providing a trailer aid, and more specifically, to an article of manufacture for providing a lunette ring trailer hitch lock according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "worker," and "user" refer to an entity, e.g., a human, using an article of manufacture for providing a lunette ring trailer hitch lock associated with the invention. The term used herein refers to one or more users.

The term "invention" or "present invention" refers to the invention being applied for via the patent application with the title "Mean Dog Trailer Theft Defender Lunette Lock." Invention may be used interchangeably with lock.

In general, the present disclosure relates to an article of manufacture for providing a lunette ring trailer hitch lock. To better understand the present invention, FIG. 1 illustrates a prior art example of a lunette ring trailer hitch coupled to a mounting bracket for use with the present invention. A lunette ring trailer hitch 100 attaches to larger trailers (not shown) to permit items such as chippers, generators, dumpsters, and similar trailered devices weighing between 25,000 lbs. and 50,000 lbs. to be towed from one location to another. A mounting bracket 102 attaches to a flat vertical surface on the trailer using screws, bolts, and similar mechanical coupling mechanisms through a base bracket element. The mounting bracket 102 has a series of parallel mounting holes 107a-n running along a pair of side bracket elements 108a-b that extend perpendicular to the base bracket element. A lunette ring 103 is placed between the pair of side bracket elements and aligns one or more through-holes in the lunette ring 103 with matching pairs of parallel mounting holes 107a-b. A bolt 105a-b passes through the pair of side bracket elements 108a-b and the through-holes in the lunette ring 103 to be secured by a nut 104a-b on an outer end of the bolts 105a-b. The lunette ring 103 may be coupled to a hitch (not shown) mounted onto a vehicle to tow the trailer.

As shown in FIG. 1, the bolts 105a-b engage a sequential pair of parallel mounting holes 107a-n to place the lunette ring 103 at a desired height on the trailer. The lunette ring 103 may be located in a number of different positions by using the sequential pair of parallel mounting holds 107a-n at various locations within the mounting bracket 102. For a lock to successfully protect a trailer having a lunette ring 103 of this type, the lunette ring 103 must be secured to prevent it from being mounted onto a hitch and towed away and the bolts 105a-b and mating nuts 104a-b used to attach the lunette ring 103 to the mounting bracket 102 must be protected. The lunette ring lock 200 of the present invention addresses both of these vulnerabilities in ways not addressed in prior solutions.

Figure 2A:
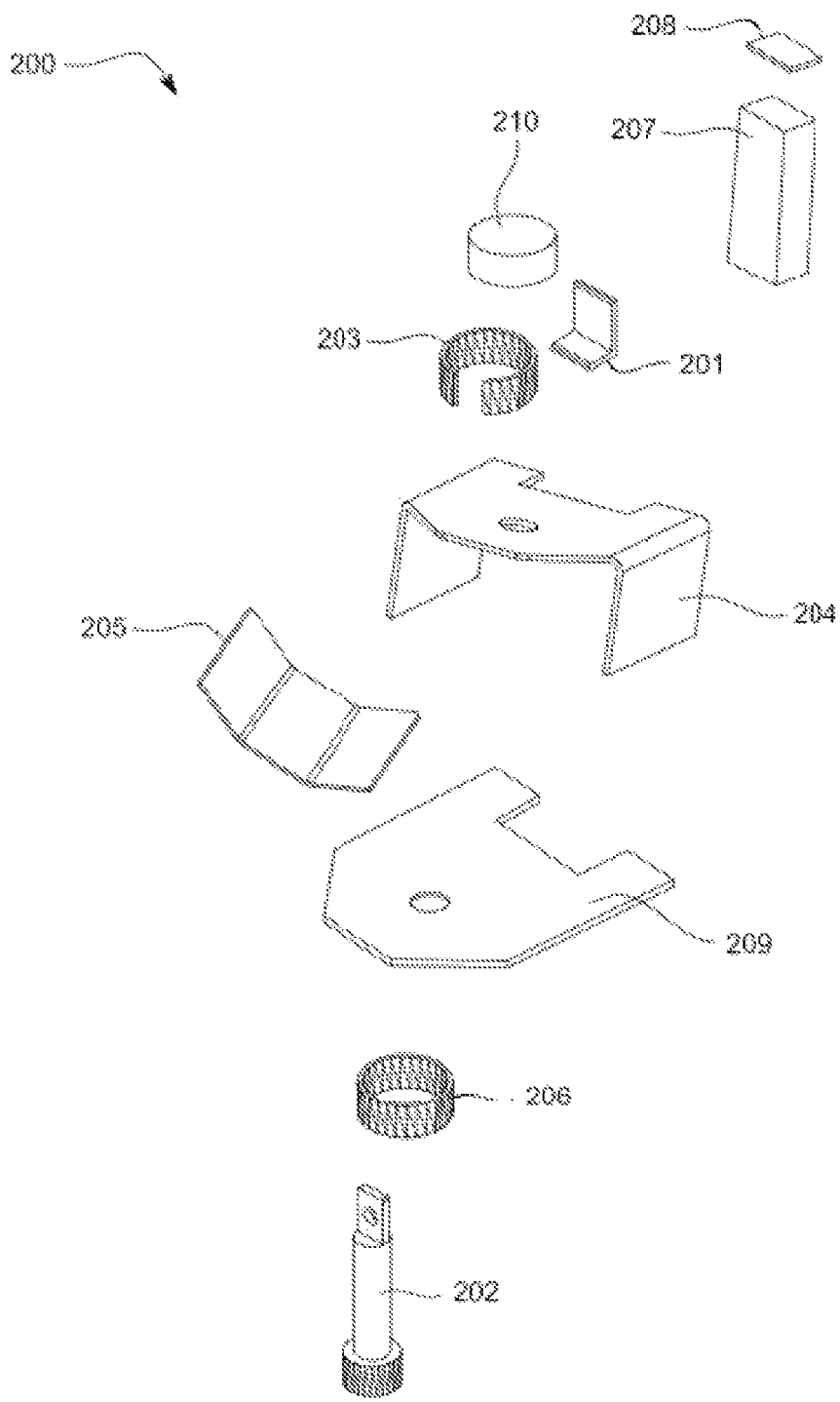
FIGS. 2a-b illustrate example embodiments of an article of manufacture providing a lunette ring trailer hitch lock and its component parts according to the present invention.
Figure 2B:
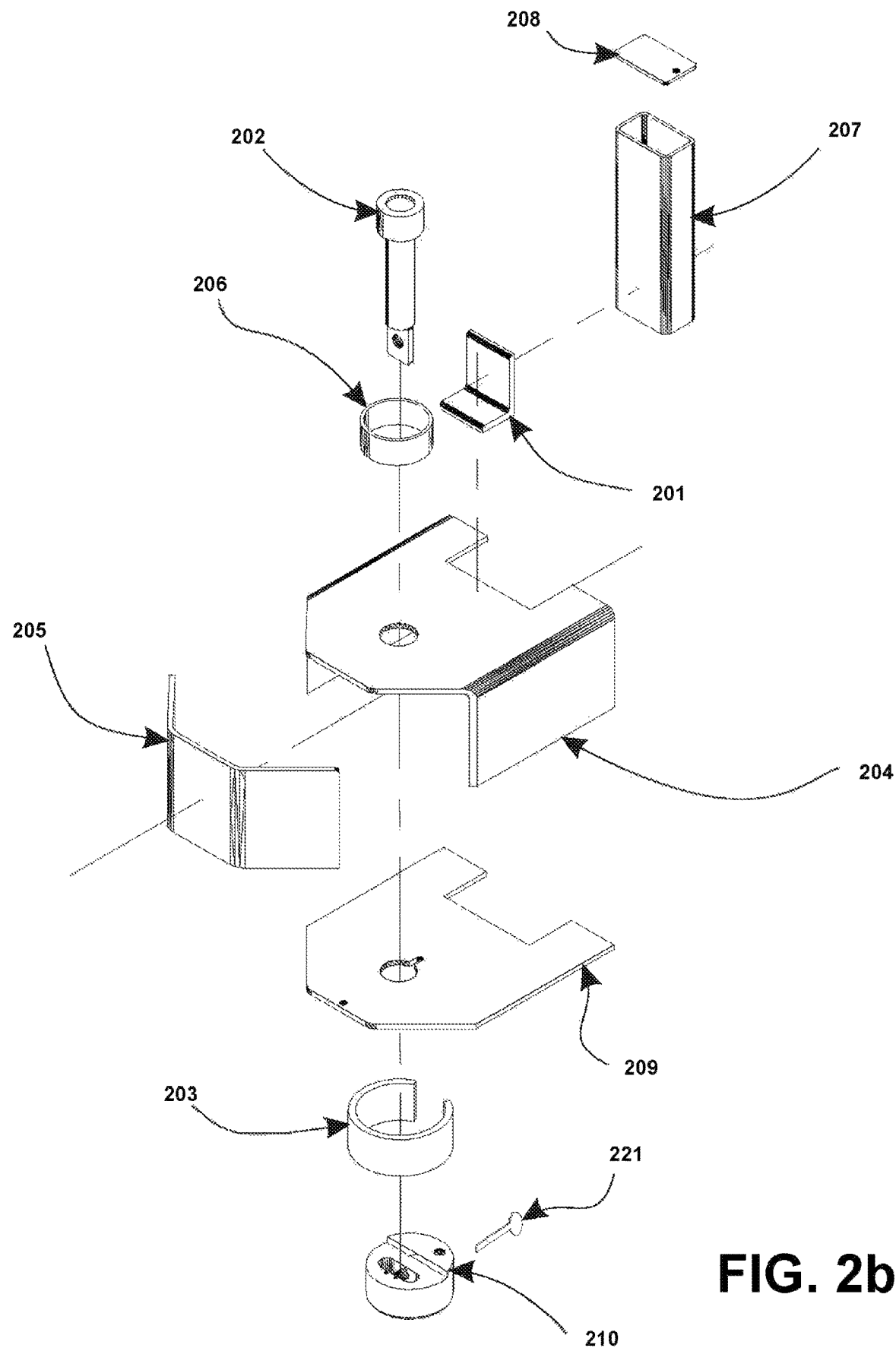

FIGS. 2a-b illustrate example embodiments of an article of manufacture for providing a lunette ring trailer hitch lock and its component parts according to the present invention. FIG. 2a shows the lunette ring lock 200 is constructed using a set of component parts shown in FIG. 2a, including: a blocking tube mounting angle 201, a locking pin 202, a puck lock holder 203, a top plate 204, a front plate 205, a pin head tube 206, a rectangular blocking tube 207, a rectangular blocking tube top plate 208, and a bottom plate 209. A commercially available puck lock 210 is used to secure the lunette ring lock 200 in place about a trailer as disclosed herein. Each of these components are described in more detail below in regard to FIGS. 5a-h.

Because the locking pin 202 passed through the top plate 204 and the bottom plate 209 to locked into place with the puck clock 210 on one end of the locking pin 202 and the opposite end of the clocking pin 202 engages the bottom plate 209 to prevent the locking pin 202 from being removed, one of ordinary skill recognizes that the locking pin 202 may be inserted both from the bottom plate 209 and then the top plate 203 as well as from the top plate 203 and then through the bottom plate 209 to place the puck lock 210 either on top of the lock when installed onto a lunette ring or on the bottom of the lock under the bottom plate 209. If the puck lock 210 would require the puck lock holder 203 to be switched with the pin head tube 206 to allow a key 221 to be inserted into the puck lock 210 when it is locked in place. In all other respects, the lunette ring lock 200 operates identically regardless of whether the puck lock 210 is installed on the top or the bottom of the lunette ring lock 200. For completeness, FIG. 2b illustrates the arrangements of the lunette ring lock 200 with the puck lock is positioned on the bottom of the lunette ring lock 200. One of ordinary skill will also recognize that the puck lock holder 203 may be oriented to have the puck lock 210 accept a key 221 in any direction.

Figure 3A:
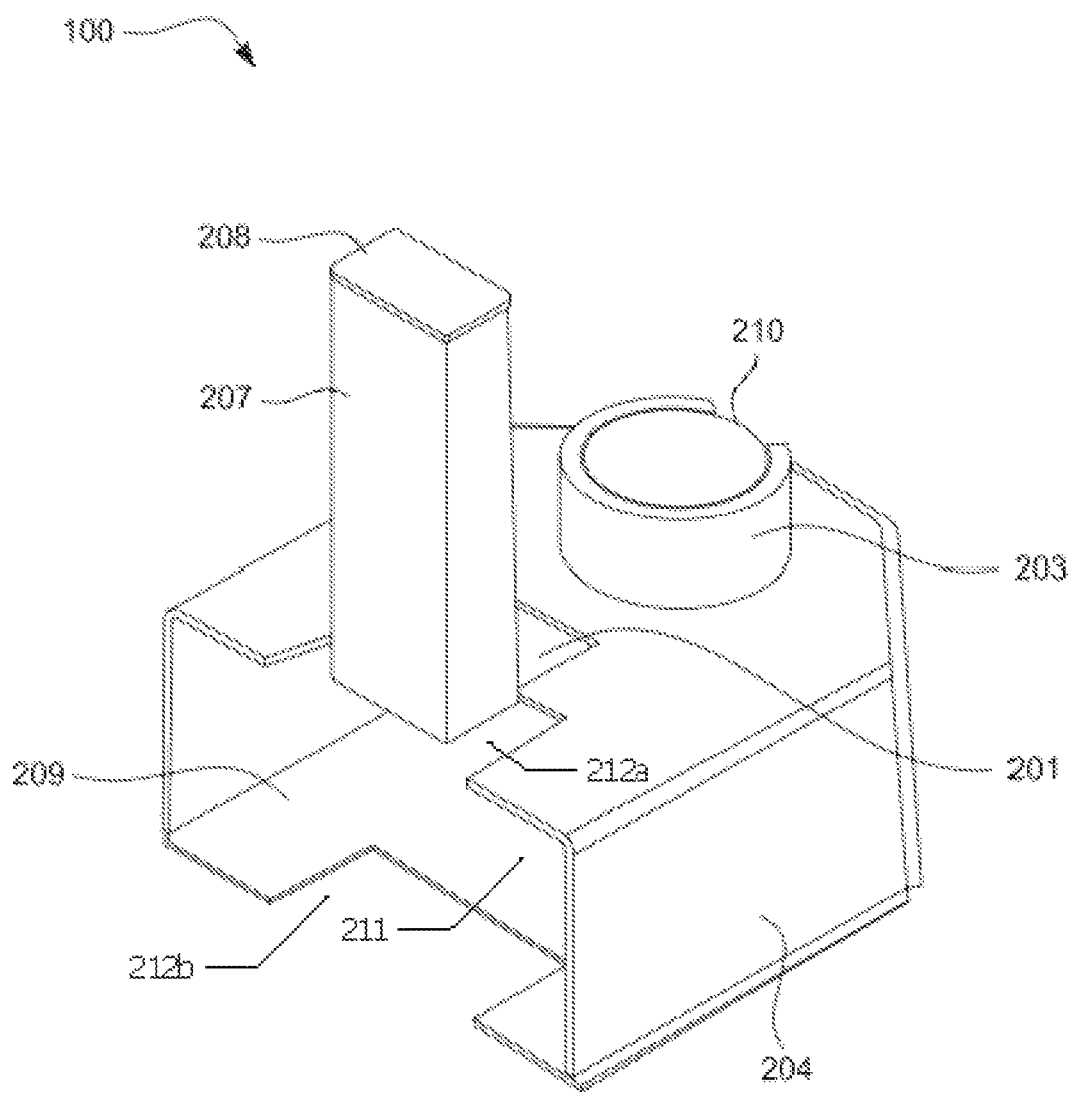
FIGS. 3a-b illustrate top and bottom perspective views of an article of manufacture for providing a lunette ring trailer hitch lock according to the present invention
Figure 3B:
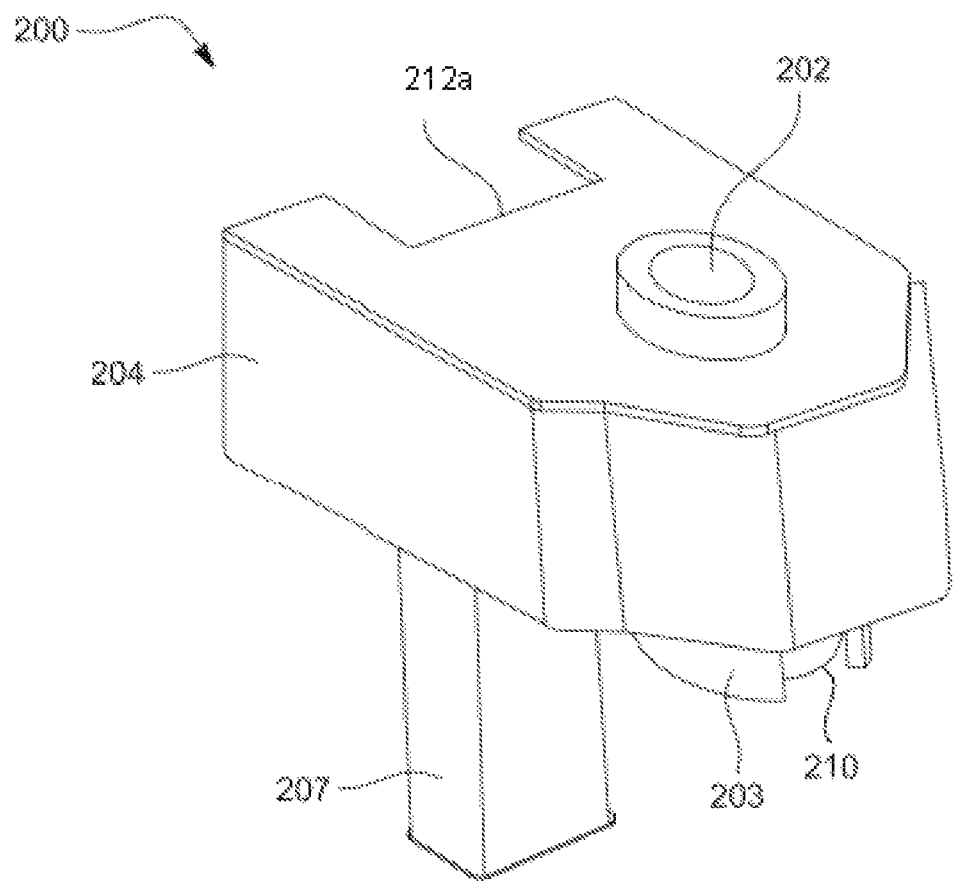

FIGS. 3a-b illustrate top and bottom perspective views of an article of manufacture for providing a lunette ring trailer hitch lock according to the present invention. FIG. 3a shows a rear, top view of the lunette ring lock with all of the components combined into a single apparatus. In a preferred embodiment, the components are made from galvanized steel that may be welded together to combine the parts of FIG. 2a into the lock shown in FIGS. 3a-b. As seen from the rear of the lunette ring lock 200, the top plate 204 and bottom plate 209 are joined together to create a lunette ring enclosure 211 that may be placed upon the lunette ring 103. In a preferred embodiment, the top plate 204 and bottom plate 209 are sized to enclose the lunette ring 103 while being closely positioned about the sides of the lunette ring 103.

The lunette ring lock 200 slides onto a lunette ring 103 once connected to the mounting bracket 102. The lunette ring enclosure 211 is large enough to permit the top plate 204 and the bottom plate 209 to cover the entire lunette ring 103 as these top and bottom plates slide backward until a pair of notches 212a-n in a rear edge of the top and bottom plates engage and surround the portions of the pair of side elements 108a-n of the mounting plate 102 including the pair of bolts 105a-b and nuts 104a-b.

The rectangular mounting tube 207 is coupled to the blocking tube mounting angle 201 that is itself coupled to an outside surface of the top plate 204. The rectangular blocking tube 207 is configured to be positioned above the pair of notches 212a-n in the top plate 204 and the bottom plate 209 such that the rectangular blocking tube 207 extends upward and is configured to be positioned directly in front of the mounting bracket 102. The rectangular blocking tube 207 is wide enough to prevent anyone from accessing screws or bolts (not shown) coupling the mounting bracket 102 to the trailer. The rectangular blocking tube 207 is shown extending away from the top plate 204 to block access within the mounting bracket 102 on one side of the lunette ring 103. This arrangement with the top plate oriented on a top side of the lunette ring 103 allows the rectangular blocking tube 207 to block a top portion of the mounting bracket 102. Such an arrangement is useful when the lunette ring 103 is coupled to the mounting bracket 102 closer to a bottom of the mounting bracket 102. When the lunette ring 103 is coupled near the top of the mounting bracket 102, the lunette ring lock 200 may be installed onto the lunette ring 103 in an opposite orientation that places the rectangular blocking tube 207 downward from the top plate 204 on an underside of the lunette ring 103. Of course, one of ordinary skill in the art will recognize that a rectangular blocking tube 207 may be coupled to both the top plate 204 and the bottom plate 209 to have the rectangular blocking tube 207 extend in both directions from the lunette ring lock 200.

The puck lock 210 is shown within the puck lock holder 203 when it is locked into place. In order for the puck lock 210 to be locked to the lunette ring lock 200, the 201 locking pin 202 is inserted into through-holes 204a, 209a in the top plate 204 and bottom plate 209 when the lunette ring lock 200 has been placed over the lunette ring 103. The locking pin 202 passes through the ring of the lunette ring 103 as it passes through the lunette ring lock 200 and a bottom surface of the locking pin 202 engages the bottom plate 209 about the through-hole 209a to prevent the locking pin 202 from passing all of the way through the lunette ring lock 200. The puck lock 210 is coupled to a top hole within the locking pin 202 once the hole is located above the top plate 204. The puck lock 210, when coupled to the locking pin 202, prevents the locking pin 202 from being removed, and as such, secures the lunette ring lock 200 to the lunette ring 103. The puck lock 210 is placed onto the locking pin 202 such that an opening for a key that operates the puck lock 210, may be accessed though a gap 203a within the puck lock holder 203.

FIG. 3b shows bottom and front views of the lunette ring lock 200. The pair of notches 212a-b are seen in the bottom plate 209 and a bottom end of the locking pin 202 is seen installed into the lunette ring lock 200 to engage the puck lock 210 on the opposite side of the top plate 204. A pin head tube 206 is coupled to an outside surface of the bottom plate 209 surrounding the bottom end of the locking pin 202. The rectangular blocking tube 207 is shown extending downward behind the lunette ring lock 200. A front plate 205 is shown along a front surface of the lunette ring lock 200 connecting the front edge of the bottom plate 209 to the front edge of the top plate 204. The addition of the front plate 205 completes the lunette ring enclosure 211 that surrounds the lunette ring 103 when the lunette ring lock 200 is installed.

Figure 4A:
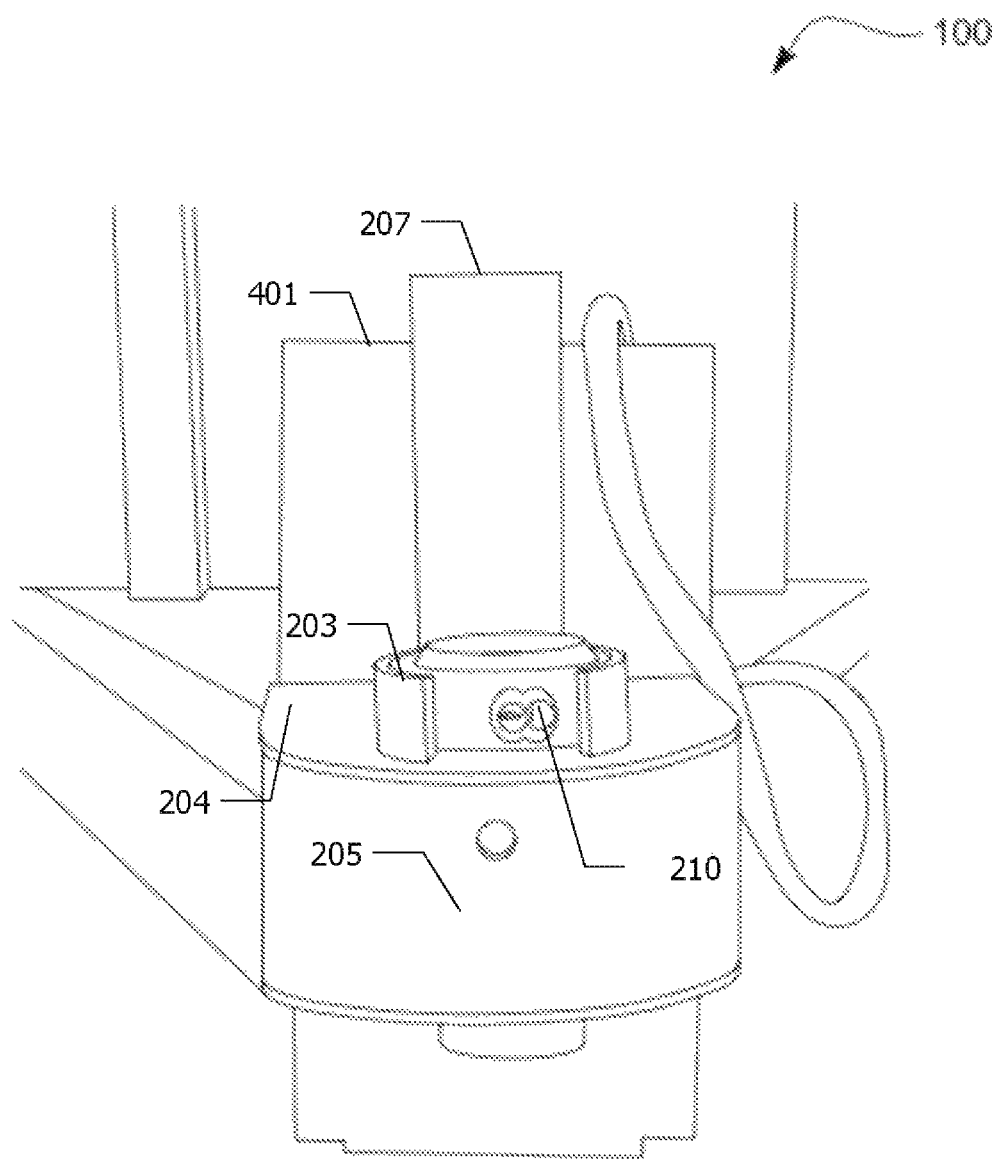
FIGS. 4a-b illustrate front and side views of the lunette lock installed onto a trailer hitch according to the present invention.
Figure 4B:
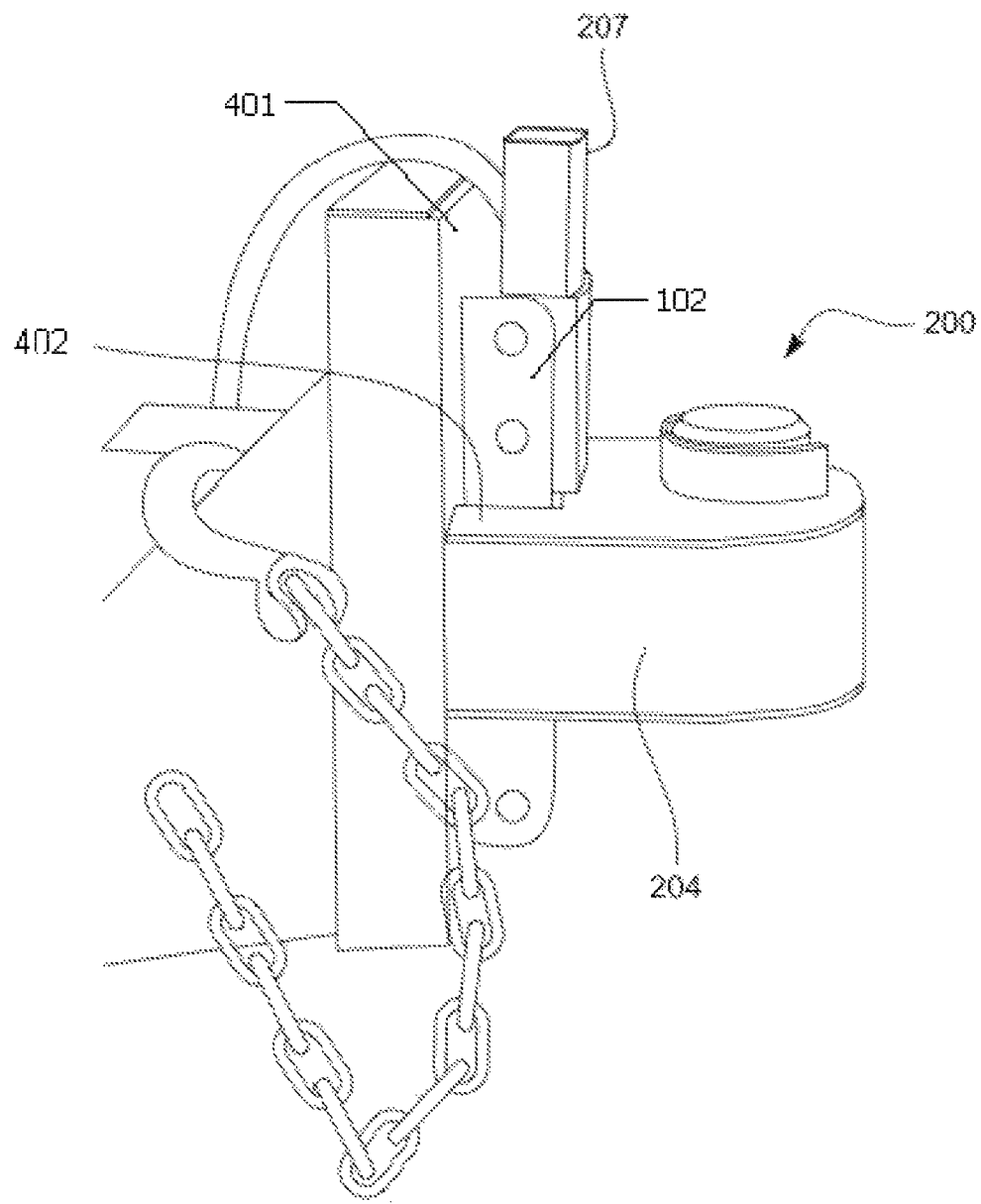

FIGS. 4a-b illustrate front and side views of the lunette lock installed onto a trailer hitch according to the present invention. FIG. 4a shows a lunette ring lock 200 installed upon a trailer 400. The mounting bracket 102 is coupled to the trailer flat vertical mounting surface 401 and the lunette ring lock 200 has been placed about the lunette ring 103. The front plate 205 is seen below the top plate 204. The puck lock holder 203 is coupled to the top plate 204 with the opening 203a exposing a keyhole to the puck lock 210. The rectangular blocking tube 207 is shown positioned in front of the mounting bracket 102 preventing access to mounting bolts or screws to the mounting bracket 102.

FIG. 4b shows a side view of the lunette ring lock 200 when installed onto a trailer 400 and about the lunette ring 103. One side of the top plate 204 is visible with the rear edge of the top plate 204 surrounding a portion 402 of the mounting bracket 102. As such, the nut 104a-b and bolt 105a-b that are used to couple the lunette ring 103 to the mounting bracket 102 are not accessible when the lunette ring lock 200 is installed. The top plate 204 surrounds the mounting bracket 102 as the pair of notches 212a-n allow the pair of side bracket elements 108a-b to extend into the lunette ring enclosure 211 pair of notches 212a-n as the top plate 204 encloses the mounting bracket 102, nuts 104a-b, and bolts 105a-b.

FIGS. 5a-i illustrate each of the components used within a lunette lock according to the present invention. The components of FIG. 5a-h illustrate the shape and dimensions of the components within a preferred embodiment. Of course, the dimensions of these components may be scaled upward and downward as needed to enclose different sized lunette rings 103. These dimensions are shown for example purposes and the present invention is intended to be defined solely within the limitations recited within the attached claims appended hereto.

Figure 5A:
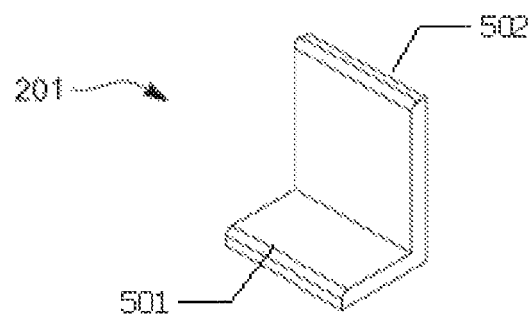
FIGS. 5a-i illustrate each of the components used within a lunette lock according to the present invention.

FIG. 5a shows the blocking tube mounting angle 201 is an L-shaped bracket having a bottom surface member 501 and a side surface member 502. The bottom surface member 501 is coupled to the outside surface of the top plate 204 and is positioned adjacent to the notch 212a in the top plate 204. The side surface member 502 is coupled to the rectangular blocking tube 207 about one of the ends.

The bottom surface member 501 is 1.5 inches by 2.0 inches is size. The side surface member 502 is 2.0 inches by 2.5 inches tall. Both of these components are 0.25 inches thick. These components are made of galvanized steel and may be welded together. In other embodiments, the lunette ring lock 200 may be made of zinc-plated steel, as well as other similar metal materials.

Figure 5B:
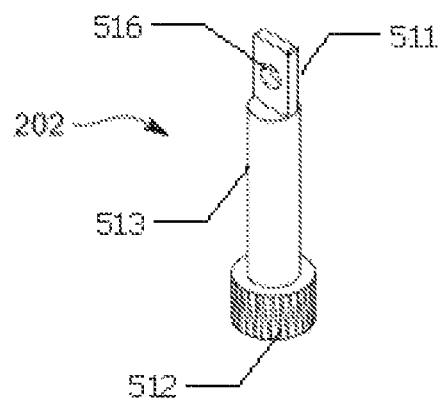

FIG. 5b shows the locking pin 202 with three components: a lock connecting top element 511, a bottom coupling surface element 512, and a central shaft element 513. The lock connecting top element 511 includes a protruding surface 515 extending upward from the central shaft element 513 and a through-hole 516 for engaging the puck lock 210. The lock connecting top element 511 extends above the top plate 204 within the puck lock holder 203 when the locking pin 202 is inserted into the lunette ring lock 200. The puck lock 210 is placed onto the locking pin 202 with the puck lock 210 engaging the through-hole 516 to lock the locking pin 202 into place. The lock connecting top element 511 1.5 inches tall by 1.25 inches wide and 0.25 inches thick. The through hole 516 is centered in the lock connecting top element 511 having a diameter of 0.5 inches.

The bottom coupling surface element 512 provides a flat surface extending outward from the central shaft element 213 to engage the bottom plate 209 when the locking pin 202 is inserted into the lunette ring lock 200. The central shaft element 513 is sized to match the diameter of the locking holes 535 in the top plate 204 and the locking hole 591 in the bottom plate 209. As such the flat surface of the coupling surface element 512 extending around the central shaft element 513 engages the bottom plate 209 about the locking hole 595 to hold the locking pin 202 in place. The coupling surface element 512 is enclosed by the pin head tube 206 that is coupled to the bottom plate 209 around the through-hole 595.

The bottom coupling surface element 512 includes a round base having a diameter of 1.63 inches and a height of 1.0 inches. The central shaft element 513 is a 1.0 in diameter cylindrical shaft centered in the round base of the bottom coupling surface element 512. The remaining 0.63 inch provides a 0.315 inch coupling surface about the central shaft element 513 to engage the bottom plate 209 about its through hole 595.

The central shaft element 513 connects the lock connecting top element 511 to the bottom coupling surface element 512 as it passes through the lunette ring enclosure 211 of the lunette ring lock 200 and the ring of the lunette ring 103. The central shaft element 513 is sized to place the through-hole 516 of the locking pin 202 within the puck lock holder 203 at a height that permits the through-hole 516 to engage the puck lock 210 when the bottom coupling surface element 512 is in contact with the bottom plate 209 within the pin head tube 206. The central shaft element 513 a 1.0 inch in diameter cylindrical shaft having a length of 4.75 inches.

Figure 5C:
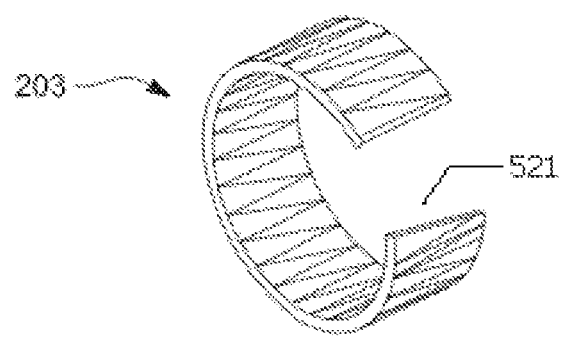

FIG. 5c shows that the puck lock holder 203 provides a lunette ring enclosure 211 about the puck lock 210 when coupled to the locking pin 202. The puck lock holder 203 has an opening 521 on one side to permit access to a keyhole in the puck lock 210 to lock and unlock the puck lock 210. The puck lock holder 203 is sized to surround the puck lock 210 to prevent access except through the opening 521 and is tall enough to cover the depth of the puck lock 210. The puck lock holder 203 is made of galvanized steel that may be welded to the top plate 204. The puck lock holder 203 is a 0.25 inch thick circular wall that is 1.5 inches tall having an inside diameter of 3.0 inches. The opening 521 provides a 1.60 inch opening on one side of the puck lock holder 203 that provides a 54° gap in the circular shape of the puck lock holder 203.

Figure 5D:
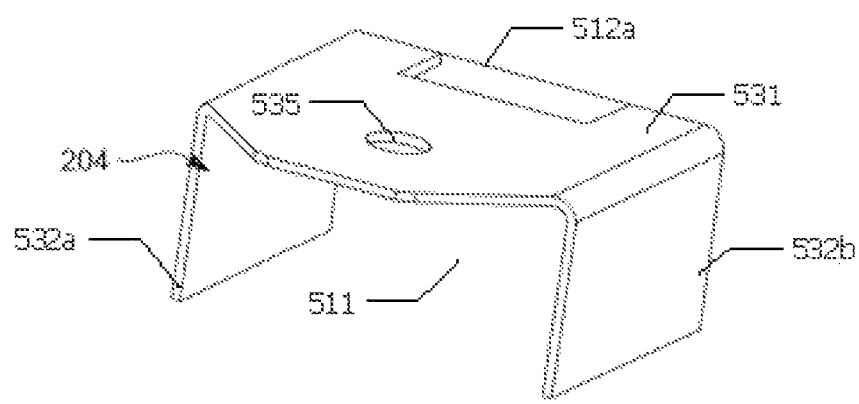

FIG. 5d shows that the top plate 204 has a top surface 531, a pair of opposing sides 532a-b, a notch 212a about a back edge and the through-hole 535. The top surface 531 and the pair of opposing sides 532a-b may be made from a single piece of galvanized steel that contains a pair of parallel bends to create the pair of opposing sides 532a-b. The top plate 204 is sized to completely surround the lunette ring 103 when the lunette ring lock 200 is installed, and thus the top plate 204 is sized to match the dimensions of the lunette ring 103. The front edge of the top plate 204 is shaped to surround an outward end of the lunette ring 103 and to mate with the front plate 205. The front surface of the top plate 204 is shown having three flat surfaces that match three flat surfaces of the front plate 205. Of course, the front surface may also be round to match the shape of the lunette ring 103 and its outer edge in other embodiments. The pair of opposing sides 532a-b are long enough to create the lunette ring enclosure 211 when the top plate 204 and bottom plate 209 are coupled together. The notch 212a is sized to match the mounting bracket 102 and tightly enclose about the mounting bracket 102.

The top plate 204 has the top surface 531 having an overall length of 9.0 inches and a width 8.0 inches. The pair of opposing sides 532a-b are 6.5 inches wide by 4.0 inches tall extending downward from the bend in the top plate 204 that forms the pair of opposing sides 532a-b from the top surface 531. The pair of opposing sides 532a-b begin along the back edge of the top surface 531 extending forward to a point where the top surface 301 begins to turn toward the opposing side. In FIG. 5d, the front edge of the top plate 204 is shown to have three straight lines that define an attachment edge to connect to the corresponding three flat surfaces of front plate 205. As shown in FIGS. 4a-b, the front edge of the top plate 204 and the corresponding front plate 205 may also be round in shape to connect the two sides of the top surface 531 to the front plate 205 between the pair of opposing sides 532a-b. The combination of the top surface 531, the pair of opposing sides 532a-b, and the front plate 205 on three of its sides and the bottom plate 209 on the final side creates the lunette ring enclosure 211 that surrounds the lunette ring 103 when the lunette lock 200 is installed. The notch 212a that engages the mounting bracket 102 is a 2.0 inch deep by 4.0 inch wide rectangular notch centered along the back edge of the top surface 531. The through hole 535 is a 1.25 inch diameter hole through the top surface having a center point 6.13 inches from the back edge of the top surface 531 along a centerline running parallel between the pair of opposing sides 532a-b.

Figure 5E:
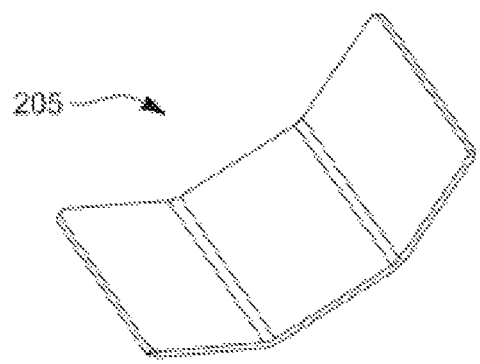

FIG. 5e shows the front plate 205 for coupling to the front edge of the top plate 204 with a top end of the front plate 205 welded to the front edge of the top surface 531 of the top plate 204 and a pair of side edges welded to the opposing sides 532a-n of the top plate 204. A bottom edge of the front plate 205 is welded to the bottom plate 209 to completely enclose a front side of the lunette ring lock 200 and create the lunette ring enclosure 211 that accepts the lunette ring 103 when the lunette ring lock 200 is installed. The front plate 205 has a length of 8.0 inches to match the front shape of the top plate 204 and the bottom plate 209. The front plate 205 extends outward a width of 2.42 inches from is back edges. In FIG. 5e, it is shown to have three rectangular panels having a center panel 1.84 inches wide. The pair of side panels extend back to the rear edge at a 45° angle.

Figure 5F:
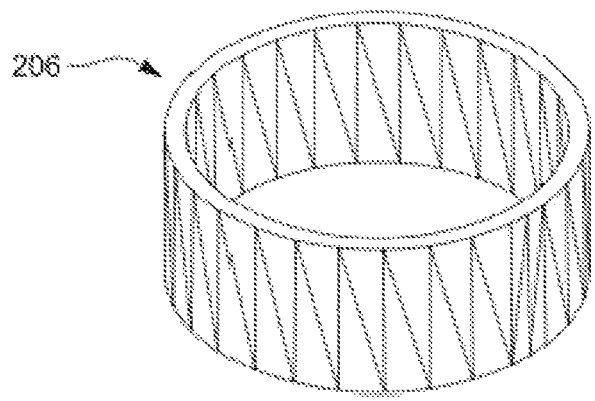

FIG. 5f shows that the pin head tube 206 provides an enclosing barrier about the locking hole 595 of the bottom plate 209. The pin head tube 206 is sized to accept the locking pin 202 and completely surround the bottom coupling surface element 512 when it engages the bottom plate 209. The pin head tube 206 is made of galvanized steel that may be welded to the bottom plate 209. The pin head tube 206 is a 0.25 inch thick circular wall that is 1.5 inches tall having an inside diameter of 3.0 inches.

Figure 5G:
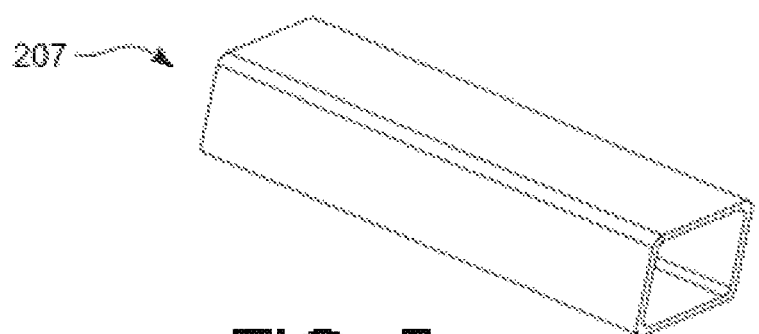

FIG. 5g shows the rectangular blocking tube 207 that is placed in front of the mounting bracket 102 when the lunette ring lock 200 is installed. The rectangular blocking tube 207 is coupled to the blocking tube mounting angle 201 at one end that attaches to the top plate 204. The opposite end of the rectangular blocking tube 207 extends outward from the top plate 204 to cover the front of the mounting bracket 102. The rectangular blocking tube 207 is placed adjacent to the notch 212a in the top plate 204 such that the rectangular blocking tube 207 may be positioned adjacent to the pair of side bracket elements 108a-b of the mounting bracket 102. An identical rectangular blocking tube 207 may be attached to the bottom plate 209 adjacent to its notch 212b using a similar blocking tube mounting angle 201 should the mounting bracket 102 be blocked both above and below the lunette ring lock 200.

Figure 5H:
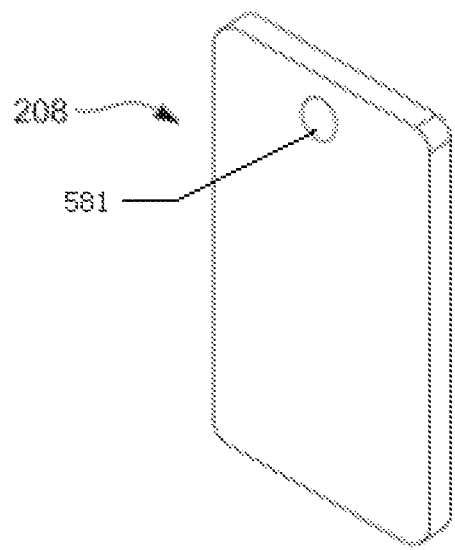

FIG. 5h shows that the rectangular blocking tube top plate 208 is a top plate coupled to the opposite end of the rectangular blocking tube 207 that is away from the top plate 204. The rectangular blocking tube top plate 208 is sized to match the dimensions of the rectangular blocking tube 207 and is welded to the end of the rectangular blocking tube 207 to prevent access within the rectangular blocking tube 207. A drain hole 281 may be located within the rectangular blocking tube top plate 208 to permit material and fluids to be drained from within the rectangular blocking tube 207 during both manufacture and use. The rectangular blocking tube 207 is a 7.25 inch long by 2.5 inch tall by 1.5 inch wide rectangular tube having a hollow center. The walls of the rectangular blocking tube 207 are 0.125 inches thick.

Figure 5I:
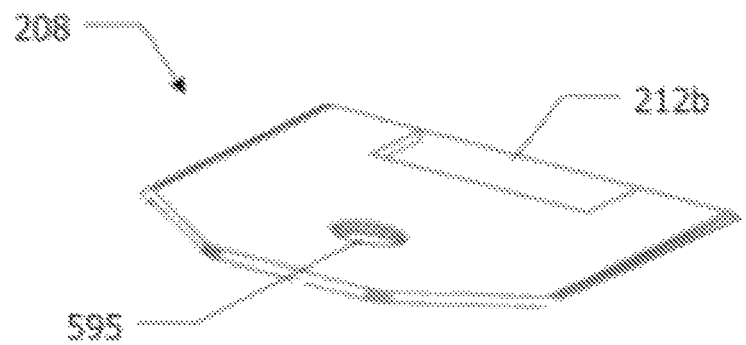

FIG. 5i shows that the bottom plate 208 is an identical plate to the top surface 531 of the top plate 204. The bottom plate 208 has an overall length of 9.0 inches and a width 8.0 inches. The pair of opposing sides 532a-b are coupled to the sides of the bottom plat 208 to form the lunette ring enclosure 211 about the lunette ring 103. Similar to the front edge of the top plate 204, the bottom plate 208 is shown to have three straight lines that define an attachment edge to connect to the corresponding three flat surfaces of front plate 205 as shown in FIG. 5i. As shown in FIGS. 4a-b, the front edge of the bottom plate 208 and the corresponding front plate 205 may also be round in shape to connect the two sides of bottom plate 208 between the pair of opposing sides 532a-b. The matching notch 212b that engages the mounting bracket 102 is a 2.0 inch deep by 4.0 inch wide rectangular notch centered along the back edge of the top surface 531. The through hole 535 is a 1.25 inch diameter hole through the top surface having a center point 6.13 inches from the back edge of the top surface 531 along a centerline running parallel between the pair of opposing sides 532a-b.

Figure 6A:
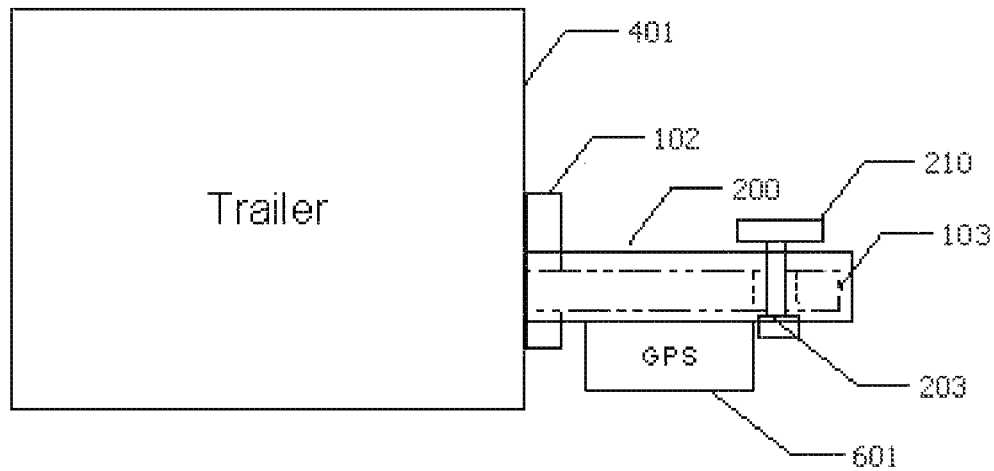
FIGS. 6a-b illustrate a lunette lock having a GPS tracking device according to the present invention.
Figure 6B:
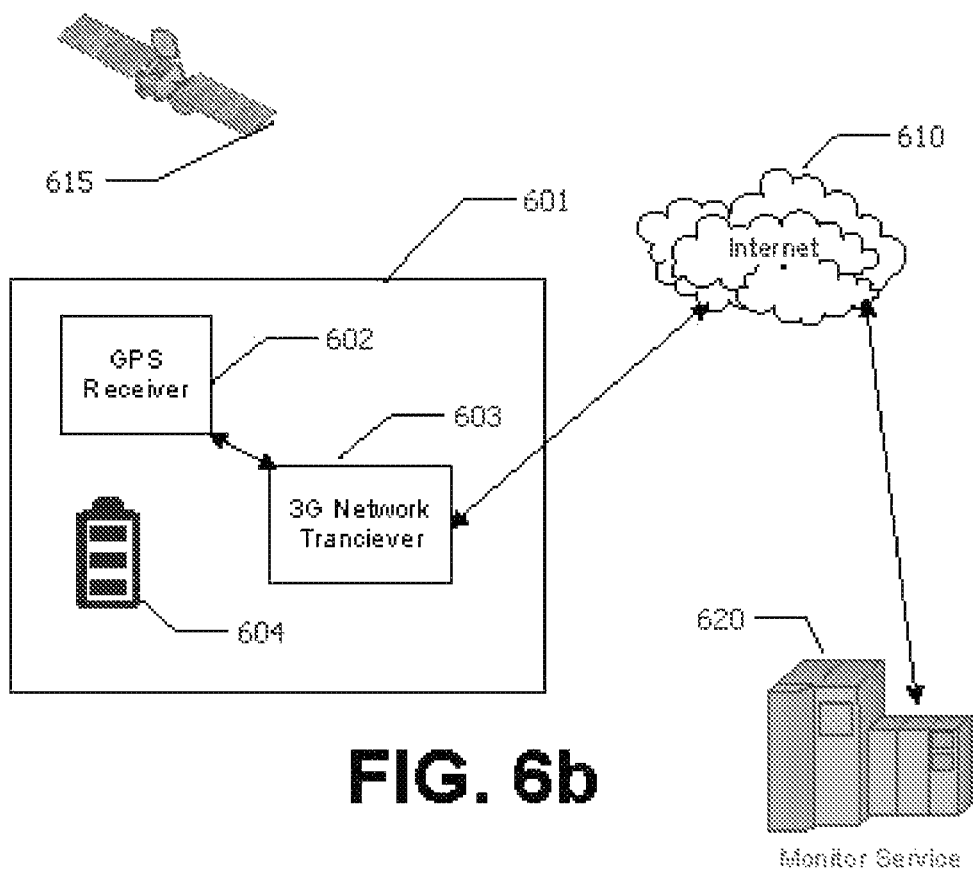

FIGS. 6a-b illustrate a lunette lock having a GPS tracking device according to the present invention. FIG. 6a shows a lunette ring lock 200 installed upon a lunette ring 103 that is coupled to a mounting bracket 102 of the trailer 401. The locking pin 203 is installed through the lunette ring enclosure 211 and is coupled to a puck lock 210. In order to provide additional security to the trailer and its contents, the lunette ring lock 200 also includes a GPS tracking device 601 to provide an ability of determine a current location of the trailer 401 and the lunette ring lock 200. The GPS tracking device 601 is shown coupled to an underside of the lunette ring 200. The GPS tracking device 601 may also be located within the lunette ring 200 to reduce an ability to discover its presence. The GPS tracking device 601 may be separately installed within the trailer 401 itself as well.

FIG. 6b shows the GPS tracking device 601 connectors to a monitoring system 620. The GPS tracking device 601 includes a GPS receiver 602, a 3G network transceiver 603, and a battery 604. The GPS receiver 602 is a self-contained GPS receiver circuit that receives position information from one or more GPS satellites 615 and outputs the position data to a network receiver. The 3G network transceiver 603 communicates with a wide area wireless communications network to connect to a monitoring computing system 620 over the Internet 610. A 3G communications network transceiver 603 may be utilized as the amount of data needed to communicate a current position to the monitoring computer system 620 is low. Additionally, the 3G network transceiver 603 may communicate with the network at a reduced number of connections per minute to reduce power consumption of the GPS tracking device 601. All of these components may be powered by an internal battery 604 which may include a rechargeable or a replaceable battery depending upon the usage of the tracking device. The monitoring computing system 620 may attempt to periodically check for the location of the GPS tracking device 601 or may await an operator initiated command to attempt to locate the trailer 401 in order to initiate communications with the GPS tracking device 601 to further reduce power consumption.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A lunette ring lock for surrounding a lunette ring hitch, the lunette ring hitch coupling to a mounting bracket on a trailer, the lunette ring lock comprises:

a lunette ring enclosure having a top plate coupled to a bottom plate by a pair of opposing side walls along a width and a front plate having a pair of long edges along its length and a pair of side edges, the front plate is coupled between the top place and bottom plates along the pair of long edges and coupled to the pair of opposing sidewalls along the side edges;

a pair of matching notches including a top notch in the top plate and a bottom notch the bottom plate centered along a back edge for surrounding a mounting plate to the lunette ring;

a locking pin for passing through a through hole in the bottom plate and a through hole in the top plate after passing through the lunette ring enclosure, the locking pin comprises a lock connecting top element, a bottom coupling surface element, and a central shaft element; and wherein the lock connecting top element engages a puck lock to retain the locking pin to the lunette ring lock between the through hole in the bottom plate and the through hole in the top plate.

2. The lunette ring lock according to claim 1, wherein the lunette ring lock further comprises:

a rectangular blocking tube coupled to the top plate adjacent to the top notch extending upward from the top plate; and a blocking tube mounting angle coupled to one side of the rectangular blocking tube at a lower end and coupled to the top plate adjacent to the top notch.

3. The lunette ring lock according to claim 1, wherein the lunette ring lock further comprises a pin head tube coupled to the top plate and centered around the through hole in the top plate to surround the bottom coupling surface element when the locking pin is installed; and a puck lock holder coupled to the bottom plate and centered around the through hole in the bottom plate to surround a puck lock coupled to the locking pin when installed.

4. The lunette ring lock according to claim 1, wherein the front plate comprises a multi-panel enclosing plate from matching shape of a front edge of the top plate and the bottom plate.

5. A trailer hitch lock for surrounding a trailer hitch, the trailer hitch coupling to a mounting bracket on a trailer, the trailer hitch lock comprises:

a hitch enclosure having a top plate coupled to a bottom plate by a pair of opposing side walls along a width and a front plate having a pair of long edges along its length and a pair of side edges, the front plate is coupled between the top place and bottom plates along the pair of long edges and coupled to the pair of opposing sidewalls along the side edges, the hitch enclosure encloses bolts and nuts securing the trailer hitch to a trailer;

a pair of matching notches including a top notch in the top plate and a bottom notch the bottom plate centered along a back edge for surrounding a mounting plate to the trailer hitch;

a locking mechanism for securing the hitch enclosure onto the trailer hitch; and wherein the lock mechanism engages a puck lock to secure the hitch enclosure about the trailer hitch.

6. The trailer hitch lock according to claim 5, wherein the trailer hitch lock further comprises:

a rectangular blocking tube coupled to the top plate adjacent to the top notch extending upward from the top plate, the rectangular blocking tube engages a channel in the mounting bracket; and a blocking tube mounting angle coupled to one side of the rectangular blocking tube at a lower end and coupled to the top plate adjacent to the top notch.

7. The trailer hitch lock according to claim 6, wherein the trailer hitch lock further comprises a blocking tube mounting angle coupled to one side of the rectangular blocking tube at a lower end and coupled to the top plate adjacent to the top notch.

8. The trailer hitch lock according to claim 6, wherein the front plate comprise a multi-panel enclosing plate from matching shape of a front edge of the top plate and the bottom plate.

\* \* \* \* \*